United States Patent
Venkatraman et al.

(10) Patent No.: US 10,334,504 B2
(45) Date of Patent: *Jun. 25, 2019

(54) SYSTEMS AND METHODS FOR REAL-TIME AND SELECTIVE ENABLEMENT OF SHARED ACCESS CELLS

(71) Applicant: Verizon Patent and Licensing Inc., Arlington, VA (US)

(72) Inventors: Shankar Venkatraman, San Jose, CA (US); Lalit R. Kotecha, San Ramon, CA (US); Sergio Aguirre, Southlake, TX (US); Lee K. Tjio, Danville, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/164,503

(22) Filed: Oct. 18, 2018

(65) Prior Publication Data

US 2019/0053123 A1 Feb. 14, 2019

Related U.S. Application Data

(63) Continuation of application No. 15/440,875, filed on Feb. 23, 2017.

(51) Int. Cl.
*H04W 48/02* (2009.01)
*H04W 24/08* (2009.01)
*H04W 88/08* (2009.01)

(52) U.S. Cl.
CPC ........... *H04W 48/02* (2013.01); *H04W 24/08* (2013.01); *H04W 88/08* (2013.01)

(58) Field of Classification Search
CPC .............................. H04W 48/02; H04W 24/08
See application file for complete search history.

(56) References Cited

U.S. PATENT DOCUMENTS

| | | | |
|---|---|---|---|
| 2011/0026422 A1* | 2/2011 | Ma | H04W 72/0453 370/252 |
| 2013/0053039 A1* | 2/2013 | Jorguseski | H04W 24/02 455/436 |
| 2013/0090124 A1* | 4/2013 | Panchal | H04L 5/0096 455/452.1 |
| 2013/0190024 A1* | 7/2013 | Hayase | H04B 15/00 455/501 |

(Continued)

*Primary Examiner* — Christopher M Brandt

(57) ABSTRACT

Techniques described herein may allow for the selective enabling and/or disabling of shared access points ("SAPs"). The selective enabling and/or disabling may occur based on the analysis of key performance indicators ("KPIs") associated with the SAPs. The selective enabling and/or disabling may cause the SAPs to cease (or continue) broadcasting their availability for User Equipment ("UEs") of a particular wireless provider, decline (or accept) bearer requests for UEs of the particular wireless provider, or terminate existing connections with UEs of the particular wireless provider. The selective enabling and/or disabling may be performed for certain applications or Quality of Service ("QoS") levels. The selective enabling and/or disabling may be performed proactively (e.g., without necessarily determining that the performance for a given SAP has not met a threshold performance), based on historical trends.

20 Claims, 8 Drawing Sheets

(56) References Cited

U.S. PATENT DOCUMENTS

| | | | | |
|---|---|---|---|---|
| 2014/0010149 A1* | 1/2014 | Cook | ............ | H04W 88/08 |
| | | | | 370/328 |
| 2015/0103719 A1* | 4/2015 | Zeng | ............ | H04W 24/02 |
| | | | | 370/311 |
| 2015/0124790 A1* | 5/2015 | Seine | ............ | H04W 76/00 |
| | | | | 370/338 |
| 2016/0157295 A1* | 6/2016 | Qin | ............ | H04W 24/02 |
| | | | | 370/329 |
| 2016/0302124 A1* | 10/2016 | Morita | ............ | H04W 16/08 |
| 2017/0135152 A1* | 5/2017 | Ji | ............ | H04W 8/005 |
| 2017/0303278 A1* | 10/2017 | Calin | ............ | H04W 4/30 |

\* cited by examiner

SYSTEMS AND METHODS FOR REAL-TIME AND SELECTIVE ENABLEMENT OF SHARED ACCESS CELLS

CROSS-REFERENCE TO RELATED APPLICATION

This application is a Continuation of co-pending U.S. patent application Ser. No. 15/440,875 (published as U.S. Patent Application Pub. No. 2018/0242220), titled "SYSTEMS AND METHODS FOR REAL-TIME AND SELECTIVE ENABLEMENT OF SHARED ACCESS CELLS," filed Feb. 23, 2017, the contents of which are hereby incorporated by reference.

BACKGROUND

User devices, such as wireless telephones may wirelessly connect to a wireless network via a base station. The base station may provide multiple carriers, to which the user devices may attach. The term "carrier" may refer to a particular radio access technology ("RAT"), a particular frequency band, and/or a particular set of frequencies within a frequency band. The frequency bands, provided by the base station, may include licensed frequency bands. "Licensed" frequency bands may be frequency bands which have been licensed, by an authoritative entity, such as a government agency, for exclusive use by a particular wireless network service provider. In some situations, the base station may also provide service according to one or more shared frequency bands. "Shared" frequency bands may be frequency bands that have been authorized (e.g., by an authoritative entity) for use by multiple wireless network service providers.

DETAILED DESCRIPTION OF PREFERRED EMBODIMENTS

Figure 1:
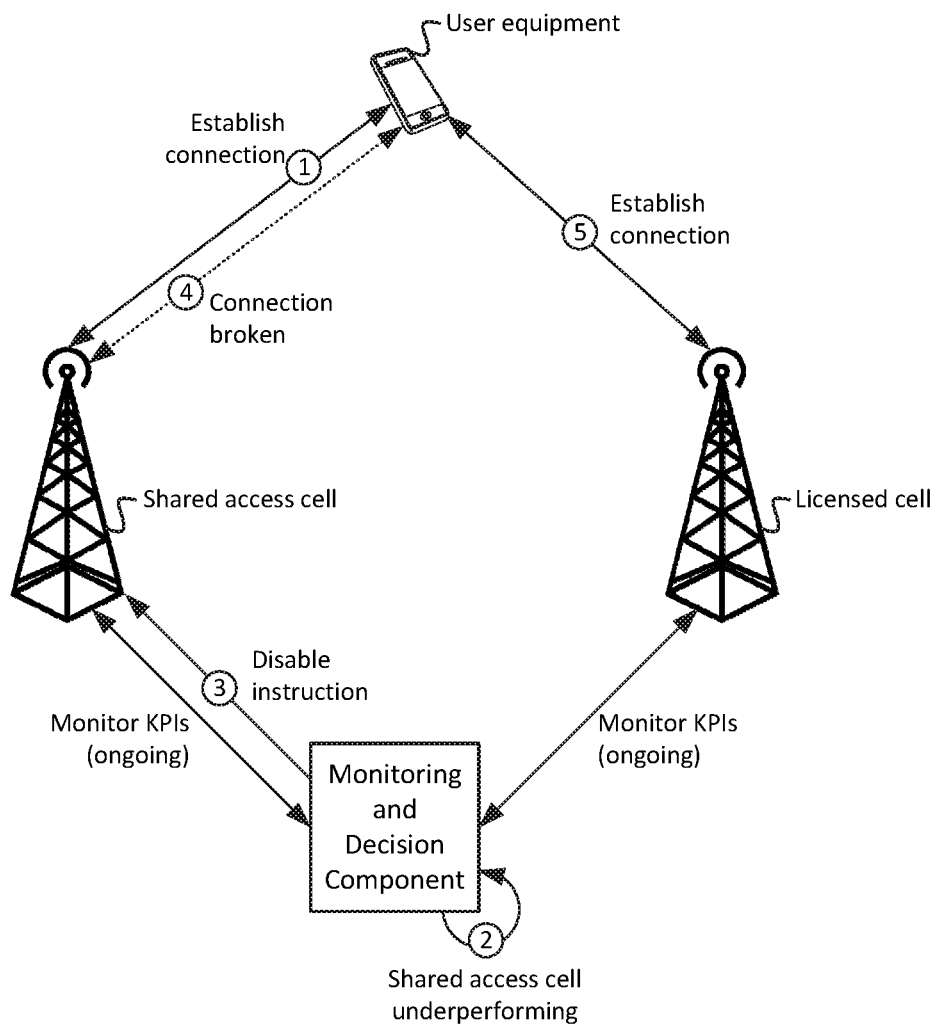
FIG. 1 illustrates an example overview of one or more implementations described herein.

The following detailed description refers to the accompanying drawings. The same reference numbers in different drawings may identify the same or similar elements.

In addition to using exclusively licensed carriers (e.g., wireless frequency bands), wireless providers may also use "shared" carriers, which are shared among multiple wireless providers. Because shared carriers are not typically exclusively controlled by a given wireless provider, challenges may arise in providing satisfactory or optimal Quality of Service ("QoS") when using shared carriers. Furthermore, since it is not typically visible to subscribers of a given wireless provider whether their devices are attached to an exclusively licensed carrier (e.g., a frequency band that is licensed for use by the wireless provider) or to a shared carrier (e.g., a frequency band that is licensed for use by the wireless provider and one or more other wireless providers), subscribers may unfairly attribute poor QoS to their wireless provider when a shared carrier provides the poor QoS.

Systems and/or methods, described herein, may allow for the selective enablement or disablement of shared carriers, based on key performance indicators ("KPIs") relating to the shared carriers and/or exclusively licensed carriers. Thus, in situations where shared access cells (e.g., coverage areas implemented by one or more devices, such as radio transceivers that implement one or more shared carriers) are not providing adequate performance, the shared access cells can be "disabled" by one or more wireless providers (e.g., by way of the one or more wireless providers providing "disable" instructions to devices that implement the shared access cells). Shared access cells that are "disabled" by a particular wireless provider may cease broadcasting their presence and/or availability to user equipment ("UE") associated with the particular wireless provider, and the UEs may attempt to connect to other cells (e.g., other shared access cells that have not been disabled, or licensed cells associated with the particular wireless provider).

As also described herein, the enablement or disablement may be performed on a per-application basis. For example, while a shared access cell may be able to provide adequate QoS for one type of application (e.g., data transfer), the same shared access cell may be unable to provide adequate QoS for another type of application (e.g., voice calling). In accordance with some implementations, such a shared access cell may be disabled for voice calling, but enabled for data transfers.

In some implementations, the enablement or disablement of shared access cells may be performed based on whether KPIs, associated with the shared access cells, exceed certain thresholds. In some implementations, the enablement or disablement may be performed based on a comparison of KPIs, associated with the shared access cells, with KPIs associated with licensed cells. In this manner, even if a shared access cell is not capable of providing optimal QoS, it may still be preferable to use the shared access cell if a licensed cell is even less capable of providing the optimal QoS.

As shown in FIG. 1, for example, a UE may establish (at arrow 1) a connection with a shared access cell. A monitoring and decision component ("MDC") may, on an ongoing basis, monitor KPIs associated with the shared access cell. As also pictured, the MDC may also monitor KPIs associated with one or more licensed cells of a particular wireless provider. The KPIs may include, for example, KPIs related to performance metrics (e.g., latency, throughput, etc.), communication quality metrics (e.g., jitter, packet error loss rate, signal strength, etc.), network load metrics (e.g., quantity of connected devices, amount of used or available resource blocks, etc.), and/or one or more other types of KPIs.

At some point, based on the monitored KPIs, the MDC may determine (at arrow 2) that the shared access cell is underperforming. For instance, one or more of the KPIs associated with the shared access cell may not meet a threshold (e.g., a minimum acceptable threshold). Additionally, or alternatively, one or more of the KPIs associated with the shared access cell may be underperforming compared to the licensed cell (e.g., the licensed cell is able to provide lower latency, lower jitter, higher signal to interference and noise ratio ("SINR"), etc.). As mentioned above, the KPIs may be evaluated on a per-application basis, and the MDC may determine whether the shared access cell is underperforming for one or more given applications.

Based on this determination, the MDC may send (at arrow 3) a "disable" instruction to the shared access cell. In some implementations, the "disable" instruction may specify one or more applications for which the shared access cell should be disabled. Based on receiving the "disable" instruction, the shared access cell may cause (at arrow 4) existing connections with UEs to be broken, and/or may stop accepting new connections from other UEs. For instance, the shared access cell may cease broadcasting information (e.g., system information blocks ("SIBs")) indicating the presence and/or availability of the shared access cell for UEs associated with the particular wireless provider.

Since the connection with the shared access cell is broken, the UE may search for another cell for wireless connectivity. As a result of the search, the UE may connect (at arrow 5) with another cell, such as the licensed cell shown in FIG. 1. Because the UE is no longer connected to the underperforming shared access cell, the UE may receive better QoS from the licensed cell, thus enhancing the experience of the user of the UE. Further, the enablement and disablement of shared access cell may allow a UE to be steered towards, or away from, shared access cells without modifying the logic and/or hardware of the UE.

Figure 2:
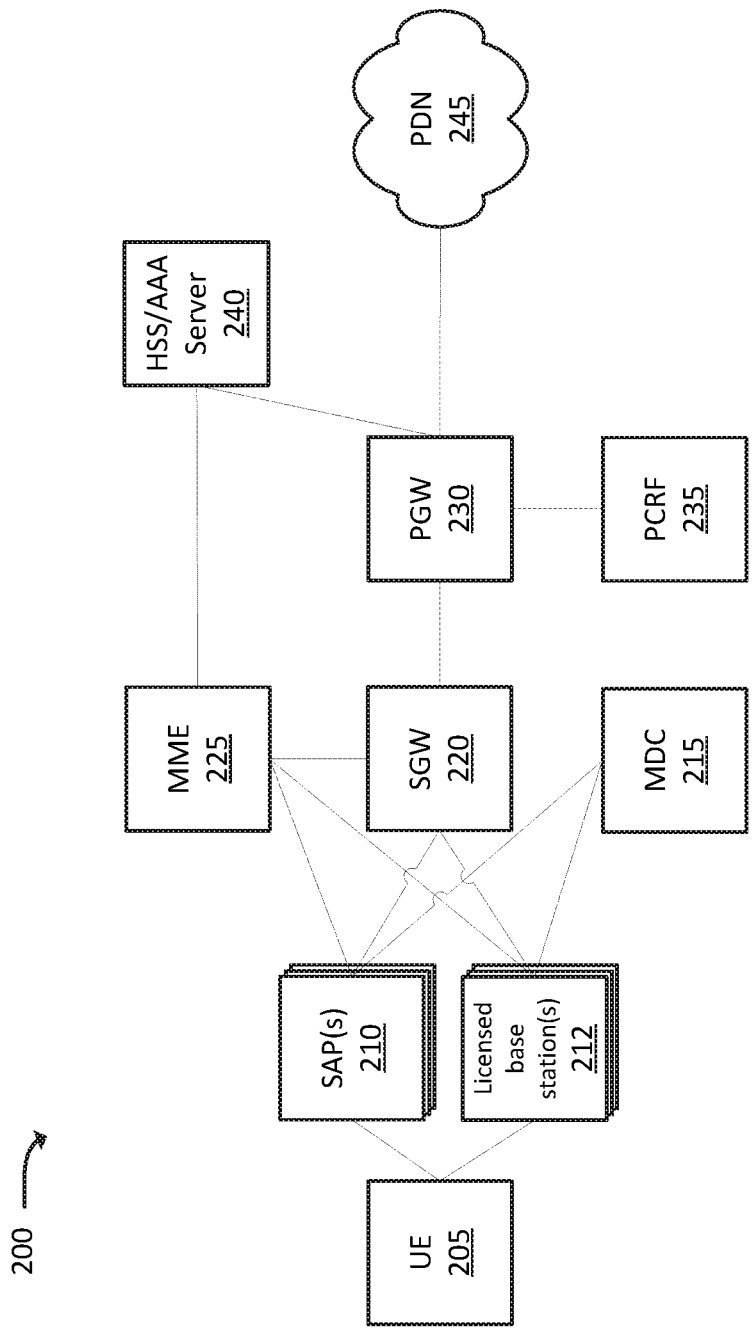
FIG. 2 illustrates an example environment, in which systems and/or methods, described herein, may be implemented.

FIG. 2 illustrates example environment 200, in which systems and/or methods described herein may be implemented. As shown in FIG. 2, environment 200 may include UE 205, one or more shared access points ("SAPs") 210, one or more licensed base stations 212, SGW 220, mobility management entity device ("MME") 225, packet data network ("PDN") gateway ("PGW") 230, policy and charging rules function ("PCRF") 235, home subscriber server ("HSS")/authentication, authorization, accounting ("AAA") server 240 (hereinafter referred to as "HSS/AAA server 240"), and PDN 245. While "direct" connections are shown in FIG. 2 between certain devices, some devices may communicate with each other via one or more intermediary devices (e.g., routers, switch, hubs, etc.) or networks (e.g., an Ethernet backhaul network ("EBH") and/or some other type of network). Furthermore, some of the connections shown in FIG. 2 may be logical connections, and may represent the communication between different logical portions of a single device. Further, in some implementations, some devices, shown in FIG. 2, may communicate with each other even though connections are not shown between such devices in the figure.

Environment 200 may include an evolved packet system ("EPS") that includes a Third Generation Partnership Project ("3GPP") radio access network ("RAN") and/or an Evolved Packet Core ("EPC") network that is operated based on a 3GPP wireless communication standard. The RAN may be, or may include, a Long-Term Evolution ("LTE") network, a fifth generation ("5G") RAN, etc., that each include one or more SAPs 210, and/or licensed base stations 212 (which may take the form of evolved NodeBs ("eNBs")), via which UE 205 may communicate with the EPC network. The EPC network may include one or more SGWs 220, PGWs 230, and/or MMEs 225, and may enable UE 205 to communicate with PDN 245 and/or an Internet protocol ("IP") multimedia subsystem ("IMS") core network (not shown). The IMS core network may include and/or communicate with HSS/AAA server 240, and may manage authentication, session initiation, account information, a user profile, etc., associated with UE 205.

UE 205 may include a computation and communication device, such as a wireless mobile communication device that is capable of communicating with SAP 210, licensed base station 212, and/or PDN 245. UE 205 may be, or may include, a radiotelephone; a personal communications system ("PCS") terminal (e.g., a device that combines a cellular radiotelephone with data processing and data communications capabilities); a personal digital assistant ("PDA") (e.g., a device that may include a radiotelephone, a pager, Internet/intranet access, etc.); a smart phone; a laptop computer; a tablet computer; a camera; a personal gaming system; or another type of mobile computation and communication device. UE 205 may send traffic to and/or receive traffic from PDN 245 via SAP 210, licensed base station 212, SGW 220, and/or PGW 230.

SAP 210 and/or licensed base station 212 may each include one or more network devices that receive, process, and/or transmit traffic, such as calls, audio, video, text, and/or other data, destined for and/or received from UE 205. In one example, SAP 210 and/or licensed base station 212 may be part of an LTE network, a 5G network, etc. SAP 210 and/or licensed base station 212 may receive traffic, destined for UE 205, from SGW 220, PGW 230, and/or PDN 245, and may output the traffic to UE 205. SAP 210 and/or licensed base station 212 may also receive traffic from UE 205, and may output the traffic to its intended destination via SGW 220, PGW 230, and/or PDN 245. In some implementations, one particular SAP 210 may be owned and/or operated by a single wireless provider, and may operate on a set of frequencies that are shared with other wireless providers. In some implementations, SAP 210 may be owned by a particular entity, and may be accessed by UEs 205 of multiple wireless providers.

SAP 210 may implement one or more shared access cells (e.g., provide wireless connectivity to UE 205 on one or more carriers that are shared among multiple wireless providers). Licensed base station 212 may implement one or more licensed cells (e.g., provide wireless connectivity to UE 205 on one or more carriers that are exclusively licensed, such as by an authoritative and/or governmental entity, to a single wireless provider). SAP 210 and licensed base station 212 may be implemented as separate sets of radio equipment (e.g., one set of radio equipment, radio controllers, and/or towers may correspond to SAP 210, while another set of radio equipment, radio controllers, and/or towers may correspond to licensed base station 212). In some implementations, SAP 210 and licensed base station 212 may be implemented using some or all of the same equipment (e.g., some radio equipment, radio controllers, and/or towers may be used to implement a particular SAP 210 and a particular licensed base station 212).

The term "licensed," as used herein, is not meant to suggest that SAPs 210 are not licensed in any way. That is, the same or a different authoritative entity may provide "licenses" to multiple wireless providers to access SAP 210. However, the term "licensed" is used herein to differentiate base stations, cells, carriers, etc. that have been licensed for exclusive use by one wireless provider from base stations, cells, carriers, etc. that have been licensed for shared access by multiple wireless providers.

As described in greater detail below, MDC 215 may include one or more devices that monitor KPIs associated with UE 205, SAP 210, and/or licensed base station 212, and "enable" or "disable" licensed base station 212 based on the instructions. In some implementations, MDC 215 may be implemented partially or entirely within the same hardware as SAP 210, licensed base station 212, SGW 220, and/or one or more other devices. In some implementations, MDC 215 may be implemented as separate hardware from SAP 210, licensed base station 212, and SGW 220.

SGW 220 may include one or more network devices that gather, process, search, store, and/or provide information in a manner described herein. SGW 220 may, for example, aggregate traffic received from one or more base stations 210, and may send the aggregated traffic to PDN 245 via PGW 230.

MME 225 may include one or more computation and communication devices that perform operations to register UE 205 with the EPS, to establish bearer channels associated with a session with UE 205, to hand off UE 205 from the EPS to another network, to hand off UE 205 from the other network to the EPS, and/or to perform other operations. MME 225 may perform policing operations on traffic destined for and/or received from UE 205.

PGW 230 may include one or more network devices that gather, process, search, store, and/or provide information in a manner described herein. PGW 230 may aggregate traffic received from one or more SGWs 220, etc. and may send the aggregated traffic to PDN 245 (e.g., via traffic optimizer(s) 245). PGW 230 may also, or alternatively, receive traffic from PDN 245 and may send the traffic toward UE 205 via base station 210 and/or SGW 220.

PCRF 235 may include one or more devices that aggregate information to and from the EPC network and/or other sources. PCRF 235 may receive information regarding policies and/or subscriptions from one or more sources, such as subscriber databases and/or from one or more users (such as, for example, an administrator associated with PCRF 235).

HSS/AAA server 240 may include one or more devices that manage, update, and/or store, in a memory associated with HSS/AAA server 240, profile information associated with a subscriber. HSS/AAA server 240 may perform authentication, authorization, and/or accounting operations associated with the subscriber and/or a communication session with UE 205.

PDN 245 may include one or more wired and/or wireless networks. For example, PDN 245 may include an IP-based PDN, a wide area network ("WAN") such as the Internet, a private enterprise network, and/or one or more other networks. UE 205 may connect, through PGW 230, to data servers, application servers, other UEs 205, and/or to other servers or applications that are coupled to PDN 245. PDN 245 may be connected to one or more other networks, such as a public switched telephone network ("PSTN"), a public land mobile network ("PLMN"), and/or another network. PDN 245 may be connected to one or more devices, such as content providers, applications, web servers, and/or other devices, with which UE 205 may communicate.

Figure 3:
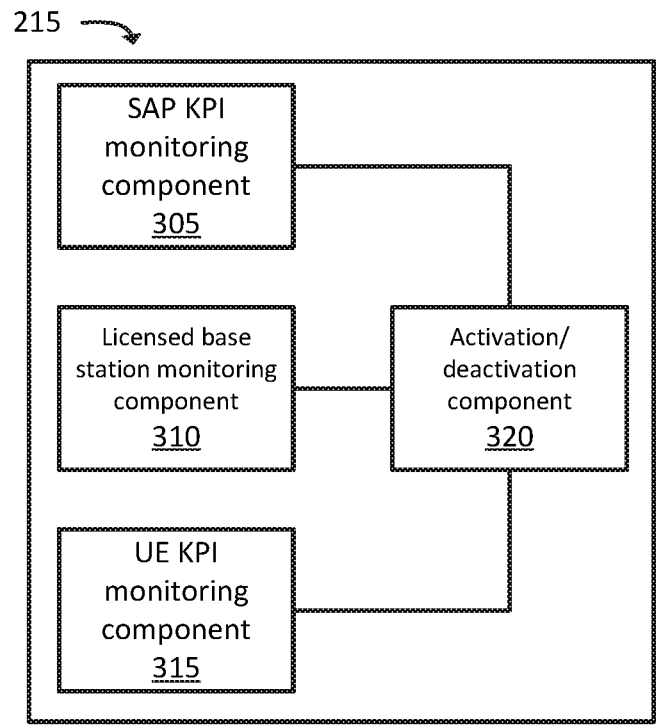
FIG. 3 illustrates example functional components of a monitoring and decision component ("MDC"), in accordance with some implementations.

FIG. 3 illustrates example functional components of MDC 215, in accordance with some implementations. As shown, MDC 215 may include SAP KPI monitoring component 305, licensed base station monitoring component 310, UE KPI monitoring component 315, and activation/deactivation component 320. These functional components may be implemented by hardware circuitry, software logic, or a combination thereof. In some implementations, the functions described as being performed by one component of MDC 215 may be performed in whole or in part by one or more other components. Additionally, in some implementations, one component may perform the function (or functions) of one or more other components.

SAP KPI monitoring component 305 may monitor KPIs associated with one or more SAPs 210. For instance, SAP KPI monitoring component 305 may be communicatively coupled, either directly or indirectly, to one or more SAPs 210. SAPs 210 may provide KPI information to SAP KPI monitoring component 305. As discussed above, the KPIs may relate to performance metrics, communication quality metrics, network load metrics, and/or other types of KPIs. In some implementations, the KPIs may be provided on a per-UE basis. For instance, SAP KPI monitoring component 305 may monitor, or receive, KPI information from a particular SAP 210, where the KPI information identifies a particular UE 205 to which the KPI information relates. The identifying information may include, for instance, an International Mobile Subscriber Identity ("IMSI") value, an International Mobile Station Equipment Identity ("IMEI"), a Mobile Directory Number ("MDN"), an IP address, a Session Initiation Protocol ("SIP") address, a Uniform Resource Identifier ("URI"), and/or some other identifier for UE 205. In some implementations, in lieu of using a "real world" identifier such as IMSI, IMEI, MDN, etc., SAP KPI monitoring component 305 may assign a unique identifier to a particular UE 205, in efforts to protect the privacy of UE 205.

SAP KPI monitoring component 305 may monitor the KPIs, relating to SAP 210, on an ongoing basis. For instance, SAP KPI monitoring component 305 may request, from SAP 210, KPI information on a periodic or intermittent basis. For example, SAP KPI monitoring component 305 may request the KPI information every second, every 30 seconds, every hour, etc. As another example, SAP KPI monitoring component 305 may request KPI information when network conditions are amenable to the KPI information being provided to SAP KPI monitoring component 305. In such implementations, SAP KPI monitoring component 305 may monitor a network and/or other communication pathway, via which SAP KPI monitoring component 305 and SAP 210 communicate, and request KPI information when the available bandwidth is above a particular threshold (and/or based on other network conditions).

Additionally, or alternatively to SAP KPI monitoring component 305 requesting the KPI information, SAP 210 may "push" the KPI information to SAP KPI monitoring component 305. That is, even in the absence of a specific request for KPI information at a given time, SAP 210 may provide (e.g., on a periodic or intermittent basis) KPI information to SAP KPI monitoring component 305. SAP KPI monitoring component 305 may request, and/or SAP 210 may push, KPI information in real time or near-real time, so that activation/deactivation component 320 (as described below) can dynamically determine whether SAP 210 should be enabled or disabled.

SAP KPI monitoring component 305 may communicate with SAP 210 via an Application Programming Interface ("API"), which allows SAP KPI monitoring component 305 to query SAP 210 for KPI information and/or allows SAP KPI monitoring component 305 and SAP 210 to establish a communication pathway via which SAP 210 can push KPI information to SAP KPI monitoring component 305. In some implementations, SAP KPI monitoring component 305 may be implemented in part at SAP 210. For example, SAP KPI monitoring component 305 may monitor physical ports and/or other hardware at SAP 210, and calculate and/or provide KPI information, based on the monitoring, to MDC 215.

In some implementations, the KPI information, monitored by SAP KPI monitoring component 305, may be averaged over a given time window. For example, if SAP KPI monitoring component 305 monitors KPI information every x seconds, the first set of KPI information may include average KPI values (e.g., average latency values, average throughout values, average jitter values, etc.) between an initial time $t_0$ and a time x seconds later, $t_x$. The next set of KPI information may include average KPI values between times $t_x$ and $t_{2x}$. The following set of KPI information may include average KPI values between times $t_{2x}$ and $t_{3x}$, and so on.

In some implementations, the KPI information may be some other function, other than the average value (e.g., maximum, minimum, median, mode, etc.), of KPI values over a given interval. For instance, referring again to an example where if SAP KPI monitoring component 305 monitors KPI information every x seconds, the first set of KPI information may include a maximum of a particular KPI between time $t_0$ and $t_x$. The next set of KPI information may include a maximum of the particular KPI between times $t_x$ and $t_{2x}$, the following set of KPI information may include the maximum of the particular KPI between times $t_{2x}$ and $t_{3x}$, and so on.

In some implementations, the KPI information may be "snapshot" information, taken at specific times (e.g., at the beginning, middle, or end of a given interval), or at arbitrary times within a given interval. For instance, referring again to an example where if SAP KPI monitoring component 305 monitors KPI information every x seconds, the first set of KPI information may include a KPI value measured at time $t_0$, the next set of KPI information may include a KPI value measured at time $t_x$, the following set of KPI information may include a KPI value measured at time $t_{2x}$, and so on.

In some implementations, the KPI information may include all "raw" KPI values measured over a given interval. The manner in which KPI information is monitored by SAP KPI monitoring component 305 (e.g., average, maximum, minimum, snapshot, all raw values, etc.) may be configurable by an owner, administrator, operator, etc. of MDC 215 and/or of SAP 210.

Licensed base station monitoring component 310 may monitor KPIs associated with one or more licensed base stations 212. Similar to the operation of SAP KPI monitoring component 305, licensed base station monitoring component 310 may receive KPIs from licensed base station 212 (e.g., based on a request to licensed base station 212 and/or based on licensed base station 212 pushing KPI information to licensed base station monitoring component 310). Licensed base station monitoring component 310 may communicate with licensed base station 212 via an API, and/or through one or more physical interfaces. Licensed base station monitoring component 310 may, in some implementations, be implemented partially or entirely within one or more licensed base stations 212. In some implementations, licensed base station monitoring component 310 may be implemented as one or more devices that are separate from licensed base station 212.

As similarly discussed above with respect to SAP KPI monitoring component 305, licensed base station monitoring component 310 may receive KPI information from licensed base station 212 at periodic and/or intermittent times. The KPI information received for a given time interval may be the average, maximum, minimum, etc. value over the given time interval. Additionally, or alternatively, the KPI information received for a given time interval may be "snapshot" KPI information within the given time interval (e.g., at an arbitrary or random time within the time interval, or at a specific time within the time interval, such as the beginning, middle, or end of the time interval). In some implementations, licensed base station monitoring component 310 may receive all "raw" KPI values, within a given time interval, from licensed base station 212. In some implementations, the KPI values may be UE-specific (e.g., information for certain KPIs may identify one or more UEs 205 with which the KPIs are associated).

UE KPI monitoring component 315 may monitor KPIs associated with one or more UEs 205. In some implementations, UE KPI monitoring component 315 may receive the KPIs via a direct communication with UE 205 (e.g., UE 205 and UE KPI monitoring component 315 may communicate, such as through an API, in order for the UE 205 to provide KPI information to UE KPI monitoring component 315). In some implementations, an application may be installed at UE 205, which communicates with UE KPI monitoring component 315. Such an application may be installed, for example, with the consent of a user of UE 205, and with the option to uninstall the application entirely at the user's request. In some implementations, an operating system or firmware of UE 205 may have the "built-in" functionality to communicate with UE KPI monitoring component 315. Such functionality may be disabled by the user at any time, and the functionality may be disabled until the user "opts in" (i.e., grants affirmative consent) to provide UE KPI information.

As similarly described above with respect to SAP KPI monitoring component 305 and licensed base station monitoring component 310, UE KPI monitoring component 315 may receive KPI information from UE 205, on an ongoing basis, based on requests from UE KPI monitoring component 315 and/or based on KPI information being pushed from UE 205 to UE KPI monitoring component 315. In some implementations, the KPI information, received from UE 205, may relate to cells that are in communications range of UE 205. For instance, UE 205 may provide information indicating Received Signal Strength Indicator ("RSSI") values, SINR values, etc. of one or more cells (e.g., one or more SAPs 210 and/or licensed base stations 212) that are in range of UE 205. Some of the cells, for which UE 205 reports KPI information, may be cells from which MDC 215 does not receive KPI information. Alternatively, some of these cells may be cells from which MDC 215 receives KPI information, and the KPI information from UE 205, relating to these cells, may supplement KPI information received from the cells.

Activation/deactivation component 320 may, based on the KPIs monitored by SAP KPI monitoring component 305, licensed base station monitoring component 310, and/or UE KPI monitoring component 315, make determinations as to whether particular SAPs 210 should be enabled or disabled. For example, generally speaking, if the KPIs associated with a particular SAP 210 are below one or more thresholds, activation/deactivation component 320 may determine that SAP 210 should be "disabled," and send a "disable" instruction to SAP 210 (if SAP 210 is not already disabled). Upon receiving the "disable" instruction, SAP 210 may cease broadcasting its availability and/or presence to UEs 205 that are associated with a particular wireless provider (e.g., a wireless provider with which MDC 215 and licensed base stations 212 are associated), and/or may disconnect UEs 205 (associated with the particular wireless provider) that are connected to SAP 210.

If, on the other hand, the KPIs associated with SAP 210 exceed one or more thresholds, activation/deactivation component 320 may determine that SAP 210 should be "enabled," and send an "enable" instruction to SAP 210 (if SAP 210 is not already enabled). Upon receiving the "enable" instruction, SAP 210 may broadcast (or continue broadcasting) its availability and/or presence to UEs 205 that are associated with a particular wireless provider (e.g., a wireless provider with which MDC 215 and licensed base stations 212 are associated).

In some implementations, in addition to, or in lieu of evaluating the KPIs, associated with licensed base station monitoring component 310, to pre-defined thresholds, activation/deactivation component 320 may compare the KPIs, associated with SAP 210, to KPIs associated with one or more licensed base stations 212. For example, certain SAPs 210 and licensed base stations 212 may be "co-located" (e.g., located within a certain distance from each other, such as within 10 meters, 100 meters, etc.). Activation/deactivation component 320 may compare KPIs, associated with co-located SAP 210 and licensed base station 212. Based on the comparison, activation/deactivation component 320 may determine that some or all of the KPIs for licensed base station 212 exceed the KPIs for SAP 210. In some implementations, activation/deactivation component 320 may determine whether the KPIs for licensed base station 212 exceed the KPIs for SAP 210 by at least a certain amount (i.e., not just that the KPIs for licensed base station 212 exceed the KPIs for SAP 210, but that the KPIs for licensed base station 212 substantially or significantly exceed the KPIs for SAP 210). In some implementations, activation/deactivation component 320 may compare the KPIs of SAP 210 and licensed base station 212 only in situations where the KPIs for SAP 210 do not exceed a certain threshold. In this sense, even when licensed base station 212 is capable of providing better performance than SAP 210, SAP 210 may still be used when capable of providing acceptable performance. Additionally, the comparison of SAP 210 and licensed base station 212 may result in SAP 210 still being used, even in situations where SAP 210 does not provide an "acceptable" level of performance, in situations where licensed base station 212 would provide worse performance.

Once a particular SAP 210 is enabled (or disabled), activation/deactivation component 320 may start a timer, based on which the state of SAP 210 cannot be changed (e.g., cannot be set from disabled to enabled or vice versa). The use of this timer may prevent the excessive enabling and disabling of SAP 210, which could result in a poor user experience for UEs 205. Once the timer has been expended, the state of SAP 210 can once again be changed, in accordance with some implementations. In some implementations, the timer for changing the state from "disabled" to "enabled" may be different from (e.g., may expire sooner than, or later than) the timer for changing the state from "enabled" to "disabled." In some implementations, the state change from "disabled" to "enabled" may have a timer, while the state change from "enabled" to "disabled" may not have a timer (e.g., the state of SAP 210 may be changed from "enabled" to "disabled" without any restriction of when the state was changed from "disabled" to "enabled"), or vice versa.

As discussed above, KPIs may be monitored on a per-UE basis. Activation/deactivation component 320 may use the identifying information, associated with KPIs, to determine whether KPIs are skewed for one UE 205 or for a set of UEs 205. For instance, if a particular UE 205 is located on subterranean level of a building, the KPIs for that UE 205 may be vastly different than KPIs for other UEs 205. Activation/deactivation component 320 may, in some implementations, perform a statistical analysis to exclude outliers (e.g., KPIs associated with certain UEs 205) when KPI information associated with particular UEs 205 is vastly different from KPI information associated with other UEs 205.

In some implementations, activation/deactivation component 320 may evaluate whether SAP 210 should be disabled or enabled on a per-application basis. For example, while the KPIs, associated with a particular SAP 210, may be acceptable for some applications, the same KPIs may not be acceptable for other applications. For instance, a voice call application may rely heavily on latency, packet loss, and jitter, without necessarily relying on a high throughput. On the other hand, a data transfer application may rely heavily on throughput, without necessarily relying heavily on latency or jitter. Accordingly, activation/deactivation component 320 may evaluate KPIs while taking into account the particular KPIs that are more critical for certain applications. Specifically, for instance, activation/deactivation component 320 may generate a score for a particular SAP 210, based on the KPIs for that SAP 210. The score may be based on the KPIs (e.g., normalized scores assigned to each KPI, and combined into an overall score for SAP 210). In some implementations, the scores for certain KPIs may be weighted more heavily for different applications. For example, latency may be scored on a normalized scale of 0-100 for data transfer applications, and on a scale of 0-200 for voice call applications.

In some implementations, activation/deactivation component 320 may evaluate KPIs on a per-QoS level basis. For instance, activation/deactivation component 320 may evaluate whether SAP 210 should be enabled or disabled for certain QoS levels (or, in the context of an LTE environment, QoS Class Identifiers ("QCIs")). Similar to the discussion above regarding per-application analysis, certain KPIs may be more heavily weighted for certain QCIs.

Once activation/deactivation component 320 determines that a particular SAP 210 should be disabled for a particular application and/or QCI, activation/deactivation component 320 may output a "disable" instruction to SAP 210, and may further indicate in the instruction which application(s) or QCI(s) should be disabled. Once SAP 210 receives an instruction that an application or a QCI should be disabled, SAP 210 may modify its broadcasting to indicate that the application or QCI is not available at SAP 210 (or may modify its broadcasting to forgo indicating that the application or QCI is available at SAP 210). Additionally, or alternatively, SAP 210 may reject bearer establishment requests for applications or QCIs that correspond to disabled applications or QCIs, and/or may terminate existing bearers that correspond to disabled applications or QCIs.

Similarly, once activation/deactivation component 320 determines that a particular SAP 210 should be enabled for a particular application and/or QCI, activation/deactivation component 320 may output an "enable" instruction to SAP 210. This instruction may indicate which application(s) or QCI(s) should be enabled. Once SAP 210 receives an instruction that an application or a QCI should be enabled, SAP 210 may modify its broadcasting to indicate that the application or QCI is available at SAP 210, and may accept bearer establishment requests for applications or QCIs that correspond to enabled applications or QCIs.

Figure 4:
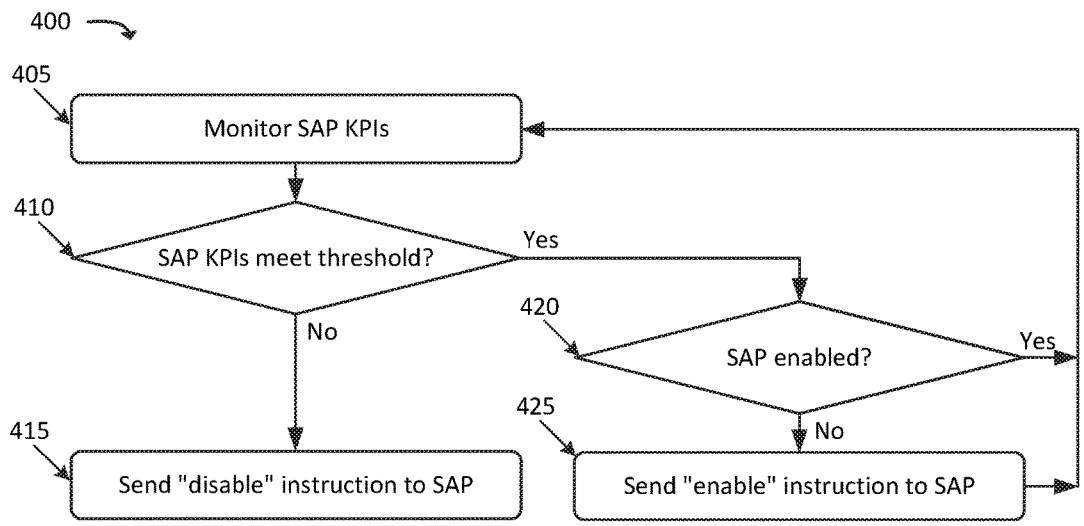
FIGS. 4-6 illustrate example processes for selectively enabling or disabling a shared access point ("SAP"), in accordance with some implementations.

FIG. 4 illustrates an example process 400, in which a particular SAP 210 may be enabled or disabled based on KPIs, associated with a particular SAP 210, meeting or not meeting threshold values. In some implementations, process 400 may be performed by MDC 215. While process 400 is described in the context of one SAP 210, the same or a similar process can be performed (e.g., simultaneously, in parallel), for multiple SAPs 210.

As shown, process 400 may include monitoring (at 405) KPIs associated with SAP 210. For example, as discussed above, MDC 215 (e.g., SAP KPI monitoring component 305) may receive KPI information associated with SAP 210 on an ongoing basis.

Process 400 may additionally include determining, based on the received KPI information, whether one or more KPIs meet a threshold (e.g., a pre-defined threshold). For instance, as discussed above, MDC 215 (e.g., activation/deactivation component 320) may compare the received information to threshold values. In determining whether the KPIs meet the thresholds, MDC 215 may determine whether a single KPI threshold is not met (e.g., where a latency threshold is not met but throughput and jitter thresholds are met), whether multiple KPI thresholds are not met (e.g., where latency and throughput thresholds are not met but a jitter threshold is met), or whether all KPI thresholds are not met.

In some implementations, MDC 215 may evaluate certain KPIs for certain applications or QCIs, while ignoring KPIs for those applications or QCIs. For instance, for a voice call application, MDC 215 may determine whether latency and jitter thresholds are met, but may not evaluate whether throughput thresholds are met. Additionally, or alternatively, as discussed above, thresholds may be different for different applications or QCIs. For instance, for a voice call application, MDC 215 may determine whether a throughput threshold is met, but that throughput threshold may be different from a throughput threshold associated with a data transfer application.

In some implementations, MDC 215 may generate a score based on the received KPI information, and may compare the score to a threshold score. For instance, as discussed above, MDC 215 may generate a score on a normalized scale for each KPI (e.g., a score between 0-100 for a latency KPI, a score between 0-100 for a jitter KPI, and so on). MDC 215 may generate an overall score based on the individual scores, and compare that overall score to a threshold score. As mentioned above, individual scores may be weighted more or less heavily based on application or QCI.

In some implementations, thresholds may change based on time of day, day of week, month of year, and/or on some other schedule. This may be useful, for instance, when higher traffic is expected during certain times. In such situations, it may be desirable to have fewer devices attached to SAP 210 and/or to licensed base station 212.

If the KPIs do not meet the threshold values (at 410-NO), then process 400 may include outputting a "disable" instruction to SAP 210. If, on the other hand, the KPIs for SAP 210 meet the threshold values (at 410-YES), then process 400 may include determining (at 420) whether SAP 210 is enabled or not. For example, MDC 215 may store information indicating the state of SAP 210 (e.g., whether SAP 210 is enabled or disabled). If the SAP is already enabled (at 420-YES), then process 400 may return to block 405, and continue monitoring KPIs associated with SAP 210. If SAP 210 is not already enabled (at 420-NO), then MDC 215 may output an "enable" instruction" to SAP 210.

Figure 5:
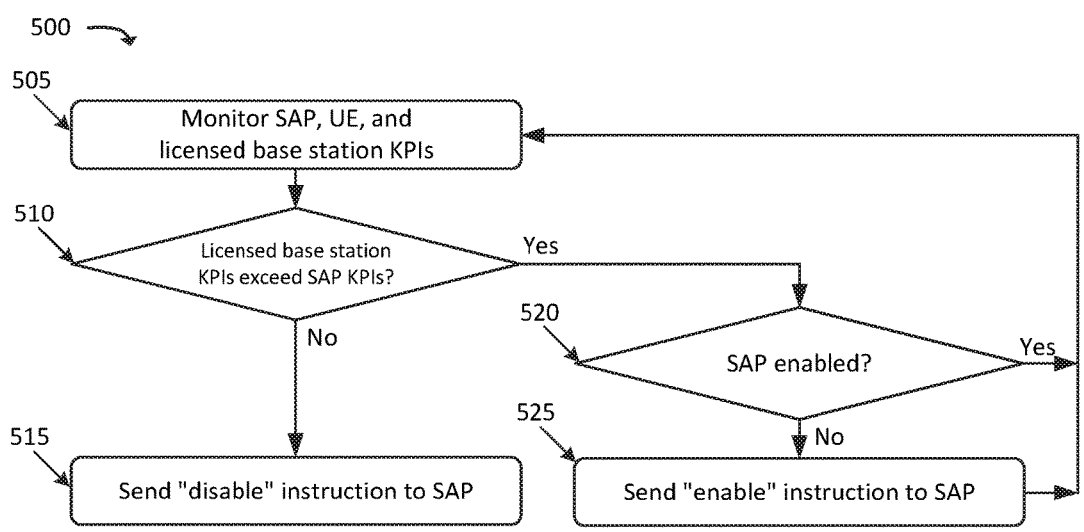

FIG. 5 illustrates an example process 500, in which a particular SAP 210 may be enabled or disabled based on whether KPIs, associated with SAP 210, exceed KPIs associated with licensed base station 212. In some implementations, process 500 may be performed by MDC 215. While process 500 is described in the context of one SAP 210, the same or a similar process can be performed (e.g., simultaneously, in parallel), for multiple SAPs 210.

As shown, process 500 may include monitoring KPI information associated with SAP 210, one or more licensed base stations 212, and/or one or more UEs 205. For example, as described above with respect to SAP KPI monitoring component 305, licensed base station monitoring component 310, and/or UE KPI monitoring component 315, MDC 215 may monitor these KPIs on an ongoing basis.

Process 500 may additionally include determining (at 510) whether KPIs for a particular licensed base station 212 exceed KPIs for SAP 210 (e.g., based on the KPI information monitored at 505). For example, MDC 215 may compare KPI information between SAP 210 and a particular licensed base station 212 that is generally co-located. For instance, as mentioned above, MDC 215 may maintain information indicating a location of one or more SAPs 210 and licensed base stations 212, and may determine that a licensed base station 212 that is located within a particular threshold distance (e.g., within 10 meters, within 100 meters, etc.) of a particular SAP 210 is "co-located" with SAP 210. As another example, MDC 215 may receive (at 505) KPI information from UE 205 regarding both a particular SAP 210 and a particular licensed base station 212 (e.g., signal strength measurements reported by UE 205), and may compare the KPIs for those particular SAP 210 and licensed base station 212.

When determining whether the KPIs for licensed base station 212 "exceed" KPIs for SAP 210, MDC 215 may generally determine if certain KPIs, for licensed base station 212, are "better" or more "favorable" than for SAP 210. For instance, a lower measure of latency may be considered "better," a higher measure of throughput may be considered "better," a lower measure of jitter may be considered "better," a higher SINR may be considered "better," and so on. In some implementations, MDC 215 may determine whether the KPIs, for licensed base station 212, exceed KPIs for SAP 210 by at least a threshold amount (e.g., a flat amount, a percentage, a proportion, etc.).

As an example, assume that a latency KPI for licensed base station 212 is 1% lower than a latency KPI for SAP 210. In this example, further assume that the threshold difference is 10% in order for MDC 215 to determine that the latency for licensed base station 212 sufficiently "exceeds" that of SAP 210. In this example, MDC 215 would determine that the latency KPI for licensed base station 212 does not sufficiently "exceed" that of SAP 210.

As similarly described above with respect to block 410 of process 400, MDC 215 may determine whether one particular KPI, associated with licensed base station 212, exceeds a corresponding KPI associated with SAP 210; whether multiple (but not all) KPIs of licensed base station 212 exceed corresponding KPIs of SAP 210; or whether all KPIs of licensed base station 212 exceed corresponding KPIs of SAP 210. As also similarly described above, MDC 215 may generate scores (e.g., normalized scores) associated with particular KPIs (which may be weighted according to applications or QCIs), generate overall scores based on these individual scores, and compare the overall score for the KPIs of SAP 210 with the overall score for the KPIs of licensed base station 212. In some implementations, MDC 215 may further determine whether the overall score, for licensed base station 212, exceeds the overall score for SAP 210 by at least a threshold amount or percentage.

If the KPIs for licensed base station 212 do not exceed the KPIs for SAP 210 (at 510 -NO), then process 500 may include outputting (at 515) a "disable" instruction to SAP 210. If, on the other hand, the KPIs for licensed base station 212 exceed the KPIs for SAP 210 (at 510-YES), then process 500 may include determining whether SAP 210 is already enabled. If the SAP is already enabled (at 520-YES), then process 500 may return to block 505, and continue monitoring KPIs associated with SAP 210. If SAP 210 is not already enabled (at 520-NO), then MDC 215 may output (at 525) an "enable" instruction" to SAP 210.

Figure 6:
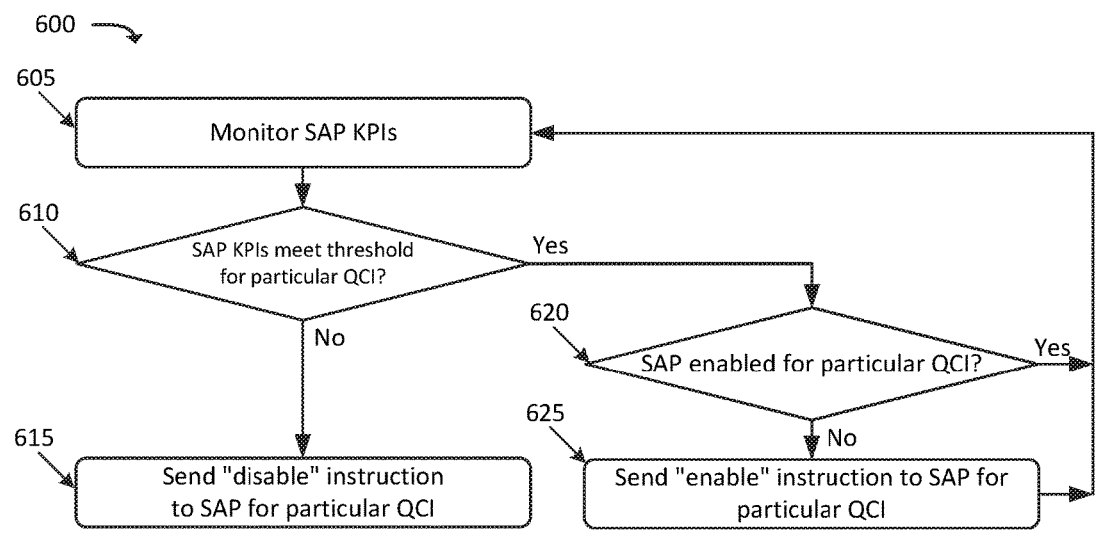

FIG. 6 illustrates an example process 600, in which a particular SAP 210 may be enabled or disabled based on KPIs, associated with SAP 210, meeting or not meeting threshold values on a per-QCI basis. In some implementations, process 500 may be performed by MDC 215. While process 600 is described in the context of one SAP 210, the same or a similar process can be performed (e.g., simultaneously, in parallel), for multiple SAPs 210. Since some of the operations of process 600 are similar to those described above with respect to process 400, not all of these operations will be explained in detail below.

As shown, process 600 may include monitoring (at 605) KPIs associated with one or more SAPs 210. Process 600 may additionally include determining (at 610) whether the KPIs for SAP 210 meet threshold values for a particular QCI.

If the KPIs do not meet the threshold values (at 610-NO), then process 600 may include outputting (at 615) a "disable" instruction to SAP 210. The "disable" instruction may specify the QCI for which SAP 210 should be disabled. As discussed above, based on this instruction, SAP 210 may cease broadcasting its availability to handle traffic according to the QCI, may stop accepting bearer establishment requests that correspond to the QCI, and/or may terminate existing bearers that are associated with the QCI. Specifically, for instance, these operations may occur on a per-operator basis. That is, different wireless providers may have different criteria for whether SAP 210 should be disabled, and the disabling and enabling would accordingly occur, for each individual wireless provider, based on instructions given by that wireless provider. Accordingly, a "disable" instruction for a particular QCI would correspond to bearers, of that QCI, for UEs 205 that are associated with the wireless provider who gave the instruction.

If, on the other hand, the KPIs for SAP 210 meet the threshold values (at 610-YES), then process 600 may include determining whether SAP 210 is already enabled for that QCI. If SAP 210 is already enabled for the QCI (at 620-YES), then process 600 may return to block 605, and continue monitoring KPIs associated with SAP 210. If SAP 210 is not already enabled for the QCI (at 620-NO), then MDC 215 may output (at 625) an "enable" instruction" to SAP 210.

Figure 7:
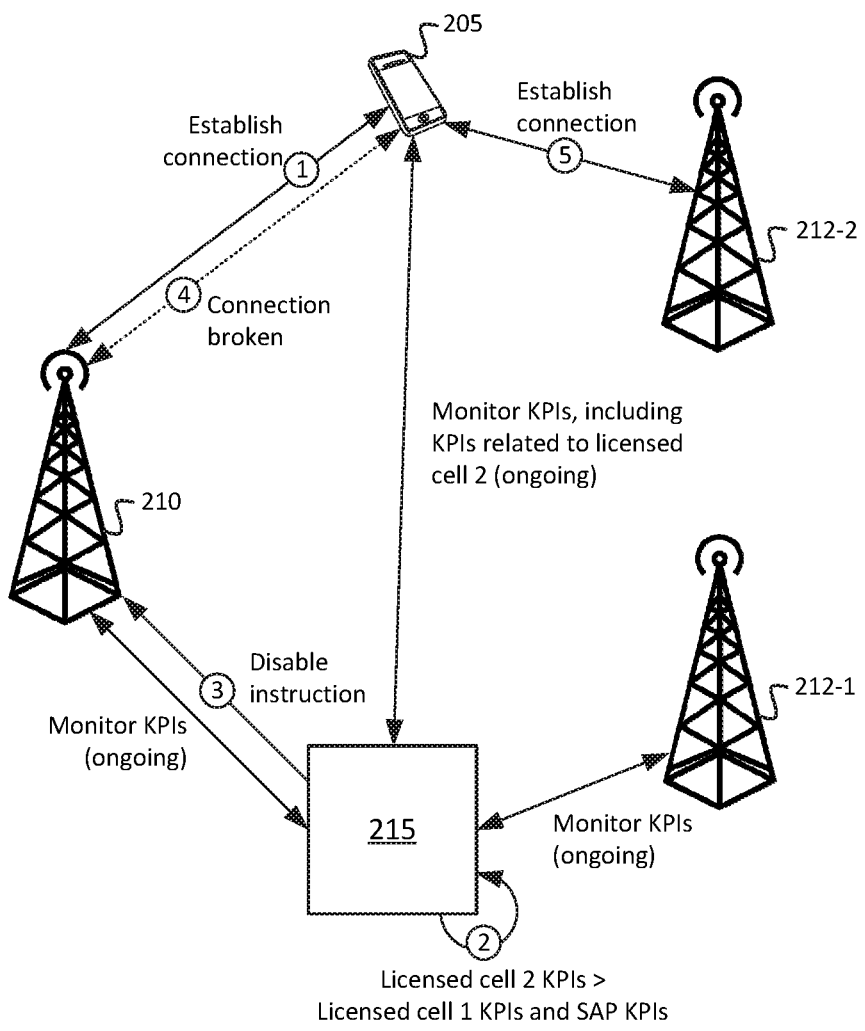
FIG. 7 conceptually illustrates an example of selective activation or deactivation of an SAP based on key performance indicators ("KPIs") of a licensed cell that does not directly provide KPIs to an MDC.

FIG. 7 conceptually illustrates an example of selective activation or deactivation of an SAP based on KPIs of a particular licensed base station 212, without necessarily needing to receive KPIs from the particular licensed base station 212. Alternatively, in some implementations, the example operations shown in FIG. 7 may supplement a process in which MDC 215 does receive KPIs from the particular licensed base station 212.

For instance, as shown, UE 205 may establish (at arrow 1) a connection with SAP 210. As also shown, MDC 215 may receive, on an ongoing basis, KPI information from SAP 210 and a first licensed base station 212 (shown as licensed base station 212-1). Licensed base station 212-2 may also be within communications range of UE 205, and UE 205 may determine KPIs related to licensed base station 212-2. For instance, UE 205 may measure signal strength-related KPIs (e.g., RSSI, SINR, or the like) for licensed base station 212-2. In some implementations, UE 205 may measure other KPIs associated with licensed base station 212-2, such as by sending and/or receiving test signals to and/or from licensed base station 212-2. As a result of these test signals, licensed base station 212-2 may be able to determine throughput, latency, jitter, and/or other types of KPIs associated with licensed base station 212-2. Accordingly, MDC 215 may be able to determine KPI information associated with licensed base station 212-2, without necessarily receiving KPI information directly from licensed base station 212-2.

As further shown, MDC 215 may determine (at arrow 2) that the KPIs associated with licensed base station 212-2 "exceed" KPIs associated with SAP 210 and licensed base station 212-1. As noted above, the terminology "exceed," in this instance, may refer to whether certain KPIs (or overall scores that are based on multiple KPIs) indicate the capability of "better" performance (e.g., lower latency, lower jitter, higher signal strength, etc.). Based on making this determination, MDC 215 may send (at arrow 3) a "disable" instruction to SAP 210, based on which the connection between SAP 210 and UE 205 may be broken (at arrow 4).

Once the connection between SAP 210 and UE 205 is broken, UE 205 may search for a new cell. Based on this search, UE 205 may locate, and connect to, licensed base station 212-2. For instance, while no explicit instruction may be sent to UE 205 to connect to licensed base station 212-2 over licensed base station 212-1, UE 205 itself may make the determination to connect to licensed base station 212-2, as a result of its cell selection parameters. For instance, the signal strength associated with licensed base station 212-2 may be better than that of licensed base station 212-1, and/or other known factors or processes may cause UE 205 to connect to licensed base station 212-2. In some implementations, MDC 215 may communicate directly with UE 205 to inform UE 205 that the KPIs of licensed base station 212-2 exceed those of licensed base station 212-1, and UE 205 may use such communication as a factor in determining to connect to licensed base station 212-2.

Figure 8:
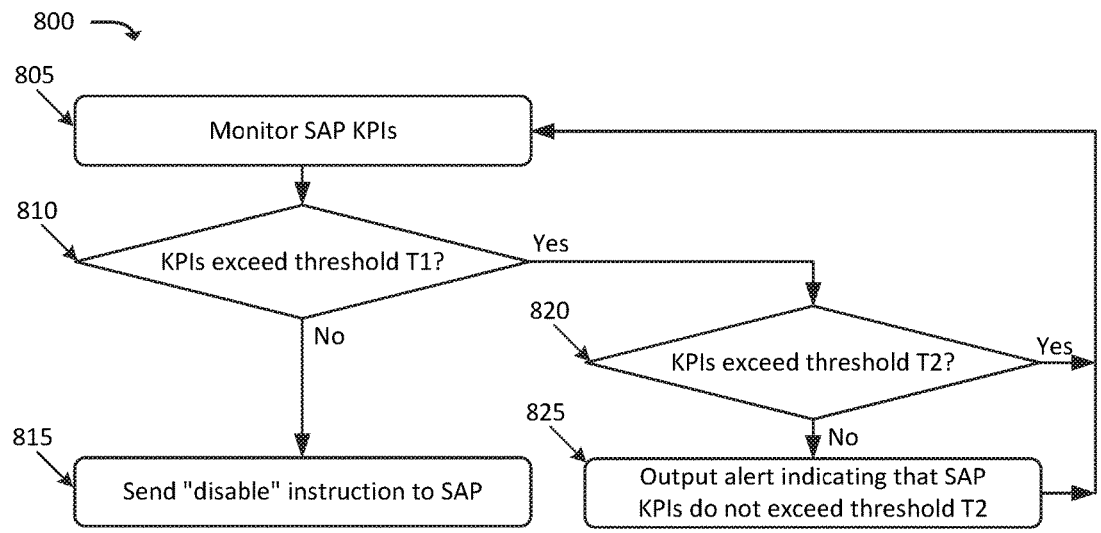
FIG. 8 illustrates an example process for selectively enabling or disabling an SAP and/or outputting an alert when certain KPIs, relating to the SAP, do not exceed a certain threshold.

FIG. 8 illustrates an example process 800, in which an alert may be provided regarding whether the KPIs for a particular SAP 210 are near, or are approaching, a threshold level at which SAP 210 should be disabled. While process 800 is described in the context of one SAP 210, the same or a similar process can be performed (e.g., simultaneously, in parallel), for multiple SAPs 210. Furthermore, as similarly described above, process 800 may be performed on a per-application and/or a per-QCI basis.

As shown, process 800 may include monitoring (at 805) KPIs associated with one or more SAPs 210. Process 800 may additionally include determining (at 810) whether the KPIs for SAP 210 meet a first set of threshold values (T1).

If the KPIs do not meet the first set of threshold values (at 810-NO), then process 800 may include outputting (at 815) a "disable" instruction to SAP 210. If, on the other hand, the KPIs for SAP 210 meet the first set of threshold values (at 810-YES), then process 800 may include determining whether the KPIs exceed a second set of threshold values (T2). The second set of threshold values may be, in general terms, an "intermediate" set of threshold values that are not necessarily indicative of performance that is poor enough to disable SAP 210. For instance, assuming that a first threshold value T1 for latency is 900 milliseconds (ms), a second threshold value T2 for latency may be 300 ms. As another example, a first threshold T1 for throughput may be 1 Megabit per second (Mbps), while a second threshold T2 for throughput may be 5 Mbps.

If the KPIs exceed the second set of threshold values (at 820-YES), then process 800 may return to block 805, and continue monitoring KPIs associated with SAP 210. If the KPIs do not exceed the second set of threshold values (at 820-NO), then MDC 215 may output (at 825) an alert indicating that the KPIs do not exceed the second set of threshold values. For example, MDC 215 may output the alert to an administrator, owner, operator, etc. associated with MDC 215. The alert may indicate which KPI(s) did not exceed the second set of threshold values, may indicate raw values associated with the KPI(s) that did not exceed the second set of threshold values, an amount of time over which the KPI(s) did not exceed the second set of threshold values, and/or other pertinent information.

Figure 9:
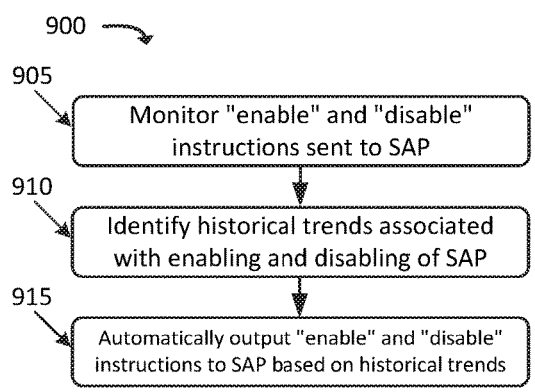
FIG. 9 illustrates an example process for proactively enabling or disabling an SAP based on historical trends.

FIG. 9 illustrates a process 900 for proactively enabling or disabling an SAP based on historical trends. In some implementations, process 900 may be performed by MDC 215. While process 900 is described in the context of one SAP 210, the same or a similar process can be performed (e.g., simultaneously, in parallel), for multiple SAPs 210. Furthermore, as similarly described above, process 900 may be performed on a per-application and/or a per-QCI basis.

As shown, process 900 may include monitoring (at 905) "enable" and "disable" instructions sent to SAP 210. For instance, over time, MDC 215 may store information (e.g., time and/or date stamps) indicating when "enable" and/or "disable" instructions were sent to SAP 210.

Process 900 may further include identifying (at 910) historical trends associated with the enabling and/or disabling of SAP 210. For instance, MDC 215 may aggregate the data monitored at 905, and perform a statistical analysis to determine certain times and/or days at which "enable" and/or "disable" instructions were typically sent to SAP 210. For instance, MDC 215 may determine that a "disable" instruction was routinely sent to SAP 210 at approximately 9:00 AM on Mondays through Fridays, and that an "enable" instruction was routinely sent to SAP 210 at approximately 5:00 PM on Mondays through Fridays. As another example, MDC 215 may determine that during the months of December and January, a "disable" instruction was routinely sent to SAP 210 at 10:00 PM on Fridays, and that an "enable" instruction was routinely sent to SAP 210 at 2:00 AM on Saturdays.

Process 900 may further include automatically outputting (at 915) "enable" and/or "disable" instructions to SAP 210 based on the historical trends identified at 910. For instance, referring to the first example above, MDC 215 may output a "disable" instruction to SAP 210 at 9:00 AM on Mondays through Fridays, and may output an "enable" instruction to SAP 210 at 5:00 PM on Mondays through Fridays. Referring to the second example above, MDC 215 may output a "disable" instruction to SAP 210 at 10:00 PM on Fridays during the months of December and January, and may output an "enable" instruction to SAP 210 at 2:00 AM on Saturdays during the months of December and January.

The automatic outputting (at 915) may be performed without having determined whether monitored KPIs exceed a threshold or KPIs for licensed base station 212 (e.g., as described above with respect to FIGS. 4-6). In some implementations, the automatic outputting (at 915) may cause the initiation of a timer, after which the state of SAP 210 cannot be changed until the timer expires. For instance, assume that MDC 215 automatically outputs (at 915) a "disable" instruction to SAP 210. MDC 215 may initiate a timer before outputting the "disable" instruction, and may monitor (or continue monitoring) KPIs associated with SAP 210. The timer may expire after a pre-defined duration, once the timer has started. After the expiration of the timer, MDC 215 may, on an ongoing basis, determine whether SAP 210 should be enabled, based on the monitored KPIs (e.g., as discussed above with respect to FIGS. 4-6).

MDC 215 may refine the times at which "enable" or "disable" instructions are automatically provided (at 915) to SAP 210. For instance, if the state of SAP 210 is changed shortly after (e.g., within a threshold period of time, such as within 10 seconds, within 1 minute, etc.) an instruction is automatically sent (at 915) to SAP 210, MDC 215 may cease automatically sending an "enable" or "disable" instruction at that particular time and/or day.

Figure 10:
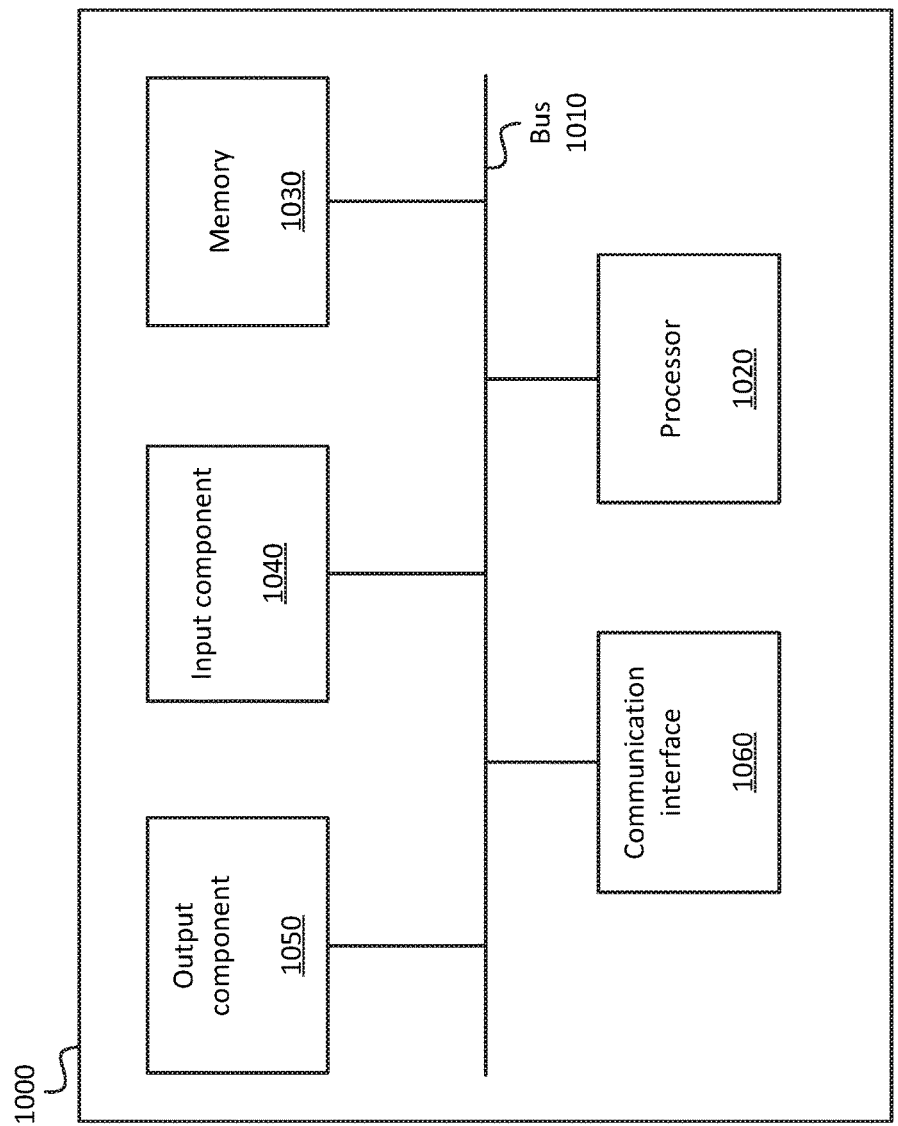
FIG. 10 illustrates example components of a device, in accordance with some implementations described herein.

FIG. 10 is a diagram of example components of device 1000. One or more of the devices described above may include one or more devices 1000. Device 1000 may include bus 1010, processor 1020, memory 1030, input component 1040, output component 1050, and communication interface 1060. In another implementation, device 1000 may include additional, fewer, different, or differently arranged components.

Bus 1010 may include one or more communication paths that permit communication among the components of device 1000. Processor 1020 may include a processor, microprocessor, or processing logic that may interpret and execute instructions. Memory 1030 may include any type of dynamic storage device that may store information and instructions for execution by processor 1020, and/or any type of non-volatile storage device that may store information for use by processor 1020.

Input component 1040 may include a mechanism that permits an operator to input information to device 1000, such as a keyboard, a keypad, a button, a switch, etc. Output component 1050 may include a mechanism that outputs information to the operator, such as a display, a speaker, one or more light emitting diodes ("LEDs"), etc.

Communication interface 1060 may include any transceiver-like mechanism that enables device 1000 to communicate with other devices and/or systems. For example, communication interface 1060 may include an Ethernet interface, an optical interface, a coaxial interface, or the like. Communication interface 1060 may include a wireless communication device, such as an infrared ("IR") receiver, a Bluetooth® radio, or the like. The wireless communication device may be coupled to an external device, such as a remote control, a wireless keyboard, a mobile telephone, etc. In some embodiments, device 1000 may include more than one communication interface 1060. For instance, device 1000 may include an optical interface and an Ethernet interface.

Device 1000 may perform certain operations relating to one or more processes described above. Device 1000 may perform these operations in response to processor 1020 executing software instructions stored in a computer-readable medium, such as memory 1030. A computer-readable medium may be defined as a non-transitory memory device. A memory device may include space within a single physical memory device or spread across multiple physical memory devices. The software instructions may be read into memory 1030 from another computer-readable medium or from another device. The software instructions stored in memory 1030 may cause processor 1020 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations.

For example, while series of blocks have been described with regard to FIGS. 4-6, 8, and 9, the order of the signals may be modified in other implementations. Further, non-dependent signals may be performed in parallel. Additionally, while the figures have been described in the context of particular devices performing particular acts, in practice, one or more other devices may perform some or all of these acts in lieu of, or in addition to, the above-mentioned devices.

The actual software code or specialized control hardware used to implement an embodiment is not limiting of the embodiment. Thus, the operation and behavior of the embodiment has been described without reference to the specific software code, it being understood that software and control hardware may be designed based on the description herein.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

Further, while certain connections or devices are shown, in practice, additional, fewer, or different, connections or devices may be used. Furthermore, while various devices and networks are shown separately, in practice, the functionality of multiple devices may be performed by a single device, or the functionality of one device may be performed by multiple devices. Further, multiple ones of the illustrated networks may be included in a single network, or a particular network may include multiple networks. Further, while some devices are shown as communicating with a network, some such devices may be incorporated, in whole or in part, as a part of the network.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well-known "opt-in" or "opt-out" processes, as may be appropriate for the situation and type of information. Storage and use of personal information may be in an appropriately secure manner reflective of the type of information (e.g., through various encryption and anonymization techniques for particularly sensitive information).

Some implementations described herein may be described in conjunction with thresholds. The term "greater than" (or similar terms), as used herein to describe a relationship of a value to a threshold, may be used interchangeably with the term "greater than or equal to" (or similar terms), unless a distinction is made herein that makes such an interpretation indefinite or inaccurate. Similarly, the term "less than" (or similar terms), as used herein to describe a relationship of a value to a threshold, may be used interchangeably with the term "less than or equal to" (or similar terms), unless a distinction is made herein that makes such an interpretation indefinite or inaccurate. As used herein, "exceeding" a threshold (or similar terms) may be used interchangeably with "being greater than a threshold," "being greater than or equal to a threshold," "being less than a threshold," "being less than or equal to a threshold," or other similar terms, depending on the context in which the threshold is used.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

What is claimed is:

1. A device, comprising:
   a non-transitory computer-readable medium storing a set of processor-executable instructions; and
   one or more processors configured to execute the set of processor-executable instructions, wherein executing the set of processor-executable instructions causes the one or more processors to:
      determine whether a performance of a wireless shared access point ("SAP"), for which access is shared by a plurality of wireless providers, meets a first threshold performance associated with a first application;
      when the performance of the wireless SAP meets the first threshold performance:
         if the wireless SAP is currently disabled for access by user equipment ("UEs") associated with the particular wireless provider, output an instruction, to the SAP, to enable the SAP for access by UEs associated with the particular wireless provider;
      when the performance of the SAP does not meet the first threshold performance:
         output an instruction, to the SAP, to disable the SAP for access by UEs associated with the particular wireless provider; and
      store information indicating a second threshold performance associated with a second application, wherein the first threshold performance is different from the second threshold performance.

2. The device of claim 1, wherein executing the processor-executable instructions further causes the one or more processors to:
   determine that a bearer establishment request has been received from a UE associated with the particular wireless provider; and
   determine that the bearer establishment request is associated with the first application,
      wherein the determination of whether the performance of the SAP meets the first threshold performance is performed based on the determination that the bearer establishment request is associated with the first application.

3. The device of claim 1, wherein the instruction, to disable the SAP for access by UEs associated with the particular wireless provider, causes the SAP to terminate existing connections with one or more UEs associated with the particular wireless provider.

4. The device of claim 1, wherein the instruction, to disable the SAP for access by UEs associated with the particular wireless provider, includes an instruction to disallow bearer establishment requests from UEs associated with the particular wireless provider.

5. A device, comprising:
a non-transitory computer-readable medium storing a set of processor-executable instructions; and
one or more processors configured to execute the set of processor-executable instructions, wherein executing the set of processor-executable instructions causes the one or more processors to:
determine whether a performance of a wireless shared access point ("SAP"), for which access is shared by a plurality of wireless providers, meets a threshold performance;
when the performance of the wireless SAP meets the threshold performance:
if the wireless SAP is currently disabled for access by user equipment ("UEs") associated with the particular wireless provider, output an instruction, to the SAP, to enable the SAP for access by UEs associated with the particular wireless provider; and
when the performance of the SAP does not meet the threshold performance:
output an instruction, to the SAP, to disable the SAP for access by UEs associated with the particular wireless provider, wherein the instruction, to disable the SAP for access by UEs associated with the particular wireless provider, includes an instruction to cease broadcasting availability of the SAP to handle bearer establishment requests from UEs associated with the particular wireless provider.

6. The device of claim 5, wherein executing the processor-executable instructions further causes the one or more processors to:
adjust the threshold based on a time of day, a day of week, or a month of year.

7. The device of claim 5, wherein executing the processor-executable instructions further causes the one or more processors to:
after outputting the instruction to enable or disable the SAP for access by UEs associated with the particular wireless provider, initiate a timer,
wherein a subsequent instruction, to enable or disable the SAP for access by UEs associated with the particular wireless provider, cannot be sent prior to expiration of the timer.

8. The device of claim 5, wherein executing the processor-executable instructions further causes the one or more processors to:
monitor instructions, outputted to the SAP, to enable or disable the SAP for access by UEs associated with the particular wireless provider;
identify one or more historical trends associated with the monitored instructions, outputted to the SAP, to enable or disable the SAP for access by UEs associated with the particular wireless provider; and
output an instruction to enable or disable the SAP, for access by UEs associated with the particular wireless provider, at one or more times that are based on the identified one or more historical trends.

9. A non-transitory computer-readable medium storing a set of processor-executable instructions, wherein execution of the set of processor-executable instructions, by one or more processors, causes the one or more processors to:
determine whether a performance of a wireless shared access point ("SAP"), for which access is shared by a plurality of wireless providers, meets a first threshold performance associated with a first application;
when the performance of the wireless SAP meets the first threshold performance:
if the wireless SAP is currently disabled for access by user equipment ("UEs") associated with the particular wireless provider, output an instruction, to the SAP, to enable the SAP for access by UEs associated with the particular wireless provider;
when the performance of the SAP does not meet the first threshold performance:
output an instruction, to the SAP, to disable the SAP for access by UEs associated with the particular wireless provider; and
store information indicating a second threshold performance associated with a second application, wherein the first threshold performance is different from the second threshold performance.

10. The non-transitory computer-readable medium of claim 9, wherein executing the processor-executable instructions further causes the one or more processors to:
determine that a bearer establishment request has been received from a UE associated with the particular wireless provider; and
determine that the bearer establishment request is associated with the first application,
wherein the processor-executable instructions, to determine whether the performance of the SAP meets the first threshold performance, include processor-executable instructions to:
determine whether the performance of the SAP meets the first threshold performance, based on the determination that the bearer establishment request is associated with the first application.

11. The non-transitory computer-readable medium of claim 9, wherein the instruction, to disable the SAP for access by UEs associated with the particular wireless provider, causes the SAP to terminate existing connections with one or more UEs associated with the particular wireless provider.

12. The non-transitory computer-readable medium of claim 9, wherein the instruction, to disable the SAP for access by UEs associated with the particular wireless provider, includes an instruction to disallow bearer establishment requests from UEs associated with the particular wireless provider.

13. A non-transitory computer-readable medium storing a set of processor-executable instructions, wherein execution of the processor-executable instructions, by one or more processors, causes the one or more processors to:
determine whether a performance of a wireless shared access point ("SAP"), for which access is shared by a plurality of wireless providers, meets a threshold performance;
when the performance of the wireless SAP meets the threshold performance:

if the wireless SAP is currently disabled for access by user equipment ("UEs") associated with the particular wireless provider, output an instruction, to the SAP, to enable the SAP for access by UEs associated with the particular wireless provider; and when the performance of the SAP does not meet the threshold performance:

output an instruction, to the SAP, to disable the SAP for access by UEs associated with the particular wireless provider, wherein the instruction, to disable the SAP for access by UEs associated with the particular wireless provider, includes an instruction to cease broadcasting availability of the SAP to handle bearer establishment requests from UEs associated with the particular wireless provider.

14. The non-transitory computer-readable medium of claim 13, wherein executing the processor-executable instructions further causes the one or more processors to:

after outputting the instruction to enable or disable the SAP for access by UEs associated with the particular wireless provider, initiate a timer, wherein a subsequent instruction, to enable or disable the SAP for access by UEs associated with the particular wireless provider, cannot be sent prior to expiration of the timer.

15. The non-transitory computer-readable medium of claim 13, wherein executing the processor-executable instructions further causes the one or more processors to:

monitor instructions, outputted to the SAP, to enable or disable the SAP for access by UEs associated with the particular wireless provider;

identify one or more historical trends associated with the monitored instructions, outputted to the SAP, to enable or disable the SAP for access by UEs associated with the particular wireless provider; and output an instruction to enable or disable the SAP, for access by UEs associated with the particular wireless provider, at one or more times that are based on the identified one or more historical trends.

16. A method, comprising:

determining, by a device, that a bearer establishment request has been received from a UE associated with a particular wireless provider;

determining, by the device, that the bearer establishment request is associated with a first application, determining, by the device and based on determining that the bearer establishment request is associated with the first application, whether a performance of a wireless shared access point ("SAP"), for which access is shared by a plurality of wireless providers, meets a first threshold performance associated with the first application;

storing, by the device, information indicating a second threshold performance associated with a second application, wherein the first threshold performance is different from the second threshold performance;

when the performance of the wireless SAP meets the first threshold performance:

if the wireless SAP is currently disabled for access by user equipment ("UEs") associated with the particular wireless provider, outputting, by the device, an instruction, to the SAP, to enable the SAP for access by UEs associated with the particular wireless provider; and when the performance of the SAP does not meet the first threshold performance:

outputting, by the device and to the SAP, an instruction to disable the SAP for access by UEs associated with the particular wireless provider.

17. A method, comprising:

determining, by a device, whether a performance of a wireless shared access point ("SAP"), for which access is shared by a plurality of wireless providers, meets a threshold performance;

when the performance of the wireless SAP meets the threshold performance:

if the wireless SAP is currently disabled for access by user equipment ("UEs") associated with the particular wireless provider, outputting, by the device, an instruction, to the SAP, to enable the SAP for access by UEs associated with the particular wireless provider;

when the performance of the SAP does not meet the threshold performance:

outputting, by the device and to the SAP, an instruction to disable the SAP for access by UEs associated with the particular wireless provider; and after outputting the instruction to enable or disable the SAP for access by UEs associated with the particular wireless provider, initiating a timer, wherein a subsequent instruction, to enable or disable the SAP for access by UEs associated with the particular wireless provider, cannot be sent prior to expiration of the timer.

18. The method of claim 17, wherein the instruction, to disable the SAP for access by UEs associated with the particular wireless provider, causes the SAP to terminate existing connections with one or more UEs associated with the particular wireless provider.

19. The method of claim 17, wherein the instruction, to disable the SAP for access by UEs associated with the particular wireless provider, includes an instruction to disallow bearer establishment requests from UEs associated with the particular wireless provider.

20. The method of claim 17, wherein the threshold performance a first threshold performance associated with a first application, the method further comprising:

storing information indicating a second threshold performance associated with a second application, wherein the first threshold performance is different from the second threshold performance.

* * * * *